US005926770A

United States Patent [19]

Nishiyama

[11] Patent Number: 5,926,770

[45] Date of Patent: Jul. 20, 1999

[54] RADIO SELECTIVE CALLING RECEIVER

[75] Inventor: Toshirou Nishiyama, Shizuoka, Japan

[73] Assignee: NEC Corporation, Tokyo, Japan

[21] Appl. No.: 08/857,328

[22] Filed: May 16, 1997

[30] Foreign Application Priority Data

May 28, 1996 [JP] Japan .................................... 8-133859

[51] Int. Cl.[6] ........................................................ H04Q 7/14

[52] U.S. Cl. ............................ 455/575; 455/566; 455/90; 455/348

[58] Field of Search .................................. 455/38.1, 38.2, 455/38.4, 90, 347, 348, 349, 351, 566, 575; 340/825.44, 311.1

[56] References Cited

U.S. PATENT DOCUMENTS

| | | | |
|---|---|---|---|
| 4,804,954 | 2/1989 | Macnak et al. | 370/311 |
| 4,856,088 | 8/1989 | Oliwa et al. | 455/263 |
| 5,450,619 | 9/1995 | Maeda | 455/348 X |
| 5,642,102 | 6/1997 | Panther et al. | 455/158.2 X |
| 5,755,367 | 5/1998 | Yamada | 455/351 X |

*Primary Examiner*—Wellington Chin
*Assistant Examiner*—Yemane Woldetatios
*Attorney, Agent, or Firm*—Whitham, Curtis & Whitham

[57] ABSTRACT

A display portion for displaying various messages for a carrier is provided on one side surface of a substantially-rectangular-parallelepiped radio apparatus main body. The display portion is composed of a main display area and a sub display area which is narrower than the main display area. Operation switches are provided at a lower part of one side surface of the radio apparatus main body. On the other hand, a hollow rectangular parallelepiped holster has engagement pieces for pushing switches in correspondence with the operation switches. When it is detected that the operation switches are pushed by the engagement pieces for pushing the switches, display by the display portion is controlled.

14 Claims, 5 Drawing Sheets

RADIO SELECTIVE CALLING RECEIVER

BACKGROUND OF THE INVENTION

1. Field of the Invention

The present invention relates to a portable radio apparatus such as a pager, a portable telephone, a personal handy phone system (PHS) and others, and more particularly to a portable radio apparatus having a display portion.

2. Description of the Related Art

Recently, spread of a portable radio apparatus is remarkable owing to the multimedia boom. There can be exemplified a pager, a portable telephone, a PHS and others as a portable radio apparatus. This type of portable radio apparatus is usually provided with a display portion for displaying a message to a carrier. As a method for displaying a message in a display portion, the following two schemes can be considered.

One is a method for continuously displaying messages in a display portion irrespective of attachment/detachment of a portable radio apparatus or enabled/disabled operation.

The other is a method for erasing a part or all of the displayed messages in a display portion when a predetermined time lapses after an operation switch of the portable radio apparatus is pushed by a carrier.

On the other hand, a technique relating to the display portion in an electronic wristwatch is disclosed in, for example, Japanese utility model laid-open publication No. Sho 59-037587 although it is different from the portable radio apparatus. In this electronic watch, a temperature detector makes judgment upon whether the watch itself is worn on a wrist of a user. If a result of judgment is "NO", control for erasing the displayed message in a display portion is carried out.

Of the above-mentioned two displaying methods in the related art portable radio apparatus, however, the standby time is longer than the operating time and the message is always displayed in the display portion in the former case. Therefore, the consumption current used for this displaying operation is increased, which results in an extremely-short duration of life of a battery.

In the latter portable radio apparatus, a part or all of the displayed message is eliminated irrespective of use/non-use of the apparatus when a predetermined time lapses after the operation switch is pushed. A standard of judgment upon whether the carrier is really using the apparatus is therefore vague. For example, it is assumed that the portable radio apparatus displays a current time in the standby mode. In order that the carrier confirms the time, it is enough for him/her to just take a look at the display without need to push the operation switch. In the above-described latter case, however, the message is erased or limited to be partially displayed when looking at the display portion after a predetermined time lapses. Accordingly, the latter case has such an advantage as that the battery has a long duration of life, but the operability thereof is poor for the carrier.

In the above-mentioned conventional electronic watch, judgment is made upon whether the carrier wears the watch by detecting a temperature to control the displaying operation, but this method has the following problems.

In the prior art electronic watch, the method for making judgment upon whether the carrier wears the watch by detecting a change in a temperature is exclusively adopted to the electronic wristwatch which is worn around a wrist as a prevailing practice. On the other hand, the portable radio apparatus is rarely worn around the wrist. It is therefore difficult to apply the displaying method in the electronic wristwatch to the portable radio apparatus. Further, in the prior art electronic watch requires a temperature detecting function which is different from basic functions of the regular watch or the portable radio apparatus. Additional provision of a temperature detector is therefore disadvantageous for reduction in size or price.

SUMMARY OF THE INVENTION

In view of the above-mentioned drawbacks, it is therefore an object of the present invention to provide an improved portable radio apparatus.

It is another object of the present invention to provide a portable radio apparatus which has long duration of life of a battery and good operability.

In a portable radio apparatus according to the present invention including a radio apparatus main body and a display portion which is provided in the radio apparatus main body and displays at least a communication message and time information, the portable radio apparatus is characterized by comprising: a housing portion for housing the radio apparatus main body; a detector for detecting whether the radio apparatus main body is accommodated in the housing portion; and a controller for partially erasing the displayed message or information in the display portion based on a detection result obtained by the detector when the radio apparatus main body is accommodated in the housing portion.

The controller may erase all of the displayed message or information in the display portion instead of part of the same.

It is preferable to provide switches to the radio apparatus main body and form projections for pushing the switches to parts of the housing portion which correspond to the switches when the radio apparatus main body is housed in order that the detector detects that the radio apparatus main body is housed in the housing means by pushing the switches by the projections.

It is preferable that at least two switches are provided and at least two projections are formed.

In addition, the radio apparatus main body has the switches and the housing portion has the projections for pushing the switches at parts corresponding with the switches when the radio apparatus main body is housed, a timer portion for measuring a time lapsed after the switches are pushed by the projections being provided, and the detector being capable of detecting that the radio apparatus main body is housed in the housing portion when a measurement result obtained by the timer portion becomes equal to or above a predetermined time.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENTS

Figure 1A:
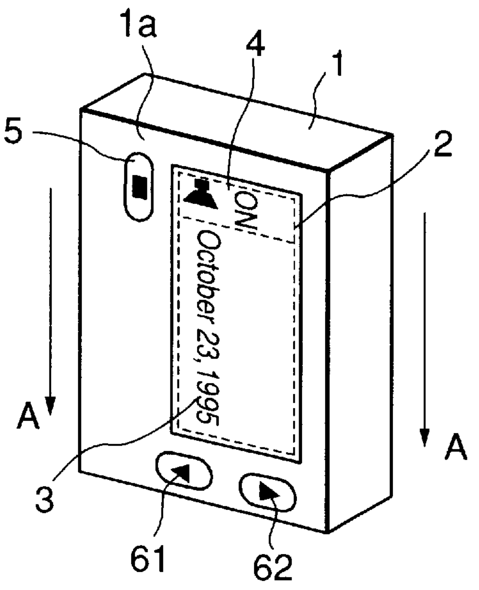
FIG. 1 is perspective views showing the appearance of a portable radio apparatus according to a preferred embodiment of the present invention.
Figure 1C:
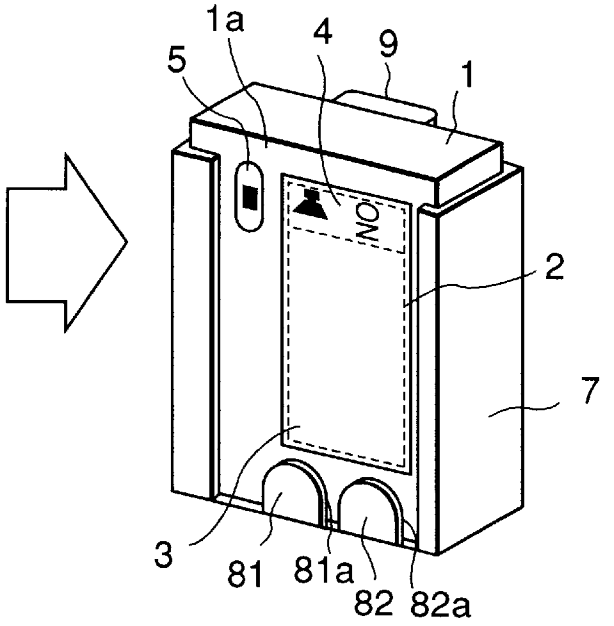
Figure 1B:
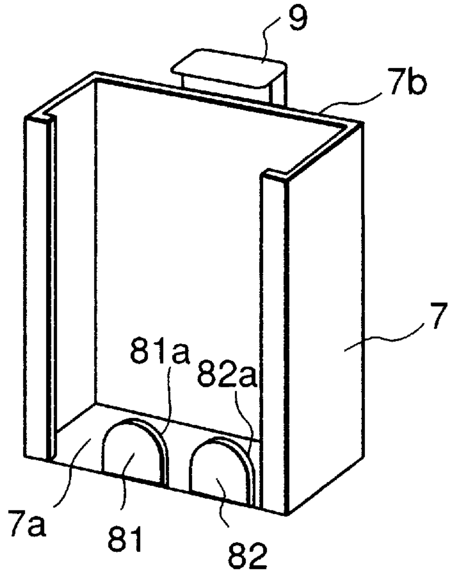

Preferred embodiments according to the present invention will now be described hereinbelow with reference to the accompanying drawings. FIGS. 1(*a*) to (*c*) are perspective views showing the appearance of a portable radio apparatus according to one embodiment of the present invention. FIG. 1(*a*) shows an appearance of a portable radio apparatus, or more preferably, a pager; FIG. 1(*b*), an appearance of a preferred holster as housing means for housing the pager; and FIG. 1(*c*), an appearance of the pager housed in the holster.

In FIG. 1(*a*), a display portion 2 for displaying various messages for a carrier is formed on one side surface 1*a* of a substantially-rectangular-parallelepiped radio apparatus main body, for example, a pager 1. The display portion 2 consists of a main display area 3 and a sub display area 4 which is narrower than the main display area 3. The main display area 3 is formed by a dot matrix type LCD (liquid crystal display). Character information consisting of a plurality of lines can be therefore displayed in the main display area 3. The main display area 3 displays a received message, a massaged received and stored, current date and time, and others. The sub display area 4 is preferably configured to enable display of segments or one-dot symbols. As such symbols, there can be exemplified a "speaker" symbol indicating that the operation for informing the carrier is carried out or an "ON" symbol indicating that the electric power is supplied. When informing the carrier, the abovementioned symbol is therefore turned on and displayed in the sub display area 4. However, the sub display area 4 may be of the dot matrix type as similar to the main display area 3. In other words, the main display area 3 displays the information which can be always displayed, while the sub display area 4 displays the information which can be temporarily displayed.

In addition, operation switches 5, 61 and 62 are formed on one side surface la of the radio apparatus main body 1. The carrier operates these operation switches 5, 61 and 62. The operation switch 5 is a switch for operating the displayed content of the display portion 2. For example, the operation switch 5 is used for erasing the displayed symbol in the sub display area 4. Also, it is used for displaying the stored message in the main display area 3. The operation switches 61 and 62 may preferably be scroll switches and used for scrolling the message displayed in the main display area 3. The operation switch 5 is formed in the upper part of the side surface 1*a,* i.e., a part away from a direction A for inserting the apparatus into the holster 7, and the operation switches 61 and 62 may be preferably formed in the lower part of the side surface 1*a,* i.e., a part close to the direction A for inserting the apparatus into the holster 7. These switches can be operated by the carrier and may be taking the form of button.

FIG. 1(*b*) shows a hollow rectangular parallelepiped holster 7 having an upper surface and one side surface being opened, the holster 7 being used for housing the radio apparatus main body 1 illustrated in FIG. 1(*a*). Engagement pieces 81 and 82 for pushing the switches are provided in accordance with the operation switches 61 and 62 of the radio apparatus main body 1 shown in FIG. 1(*a*) and formed so as to upwardly extend from an edge of a bottom plate 7*a* of the holster 7. Projections 81*a* and 82*a* protruding toward a side plate 7*b* of the holster 7 are formed on each side surface of the engagement pieces 81 and 82 for pushing the switches. Each of these projections may be formed to at least a part of the engagement piece so as to push the operation switch. Furthermore, the projection may be brought into point contact or linear contact with the operation switch. The engagement pieces do not have to be provided in accordance with each operation switch but may be configured so that the operation switches can be simultaneously pushed.

A belt attachment clip 9 is disposed to the upper part of the side plate 7*b* of the holster 7. The belt attachment clip 9 is put on a belt or the like of the carrier. That is, the holster 7 is mounted on the belt of the carrier through the belt attachment clip 9. However, the belt attachment clip 9 is not only set on the belt but may be attached on a breast pocket of a shirt or the like.

Figure 2:
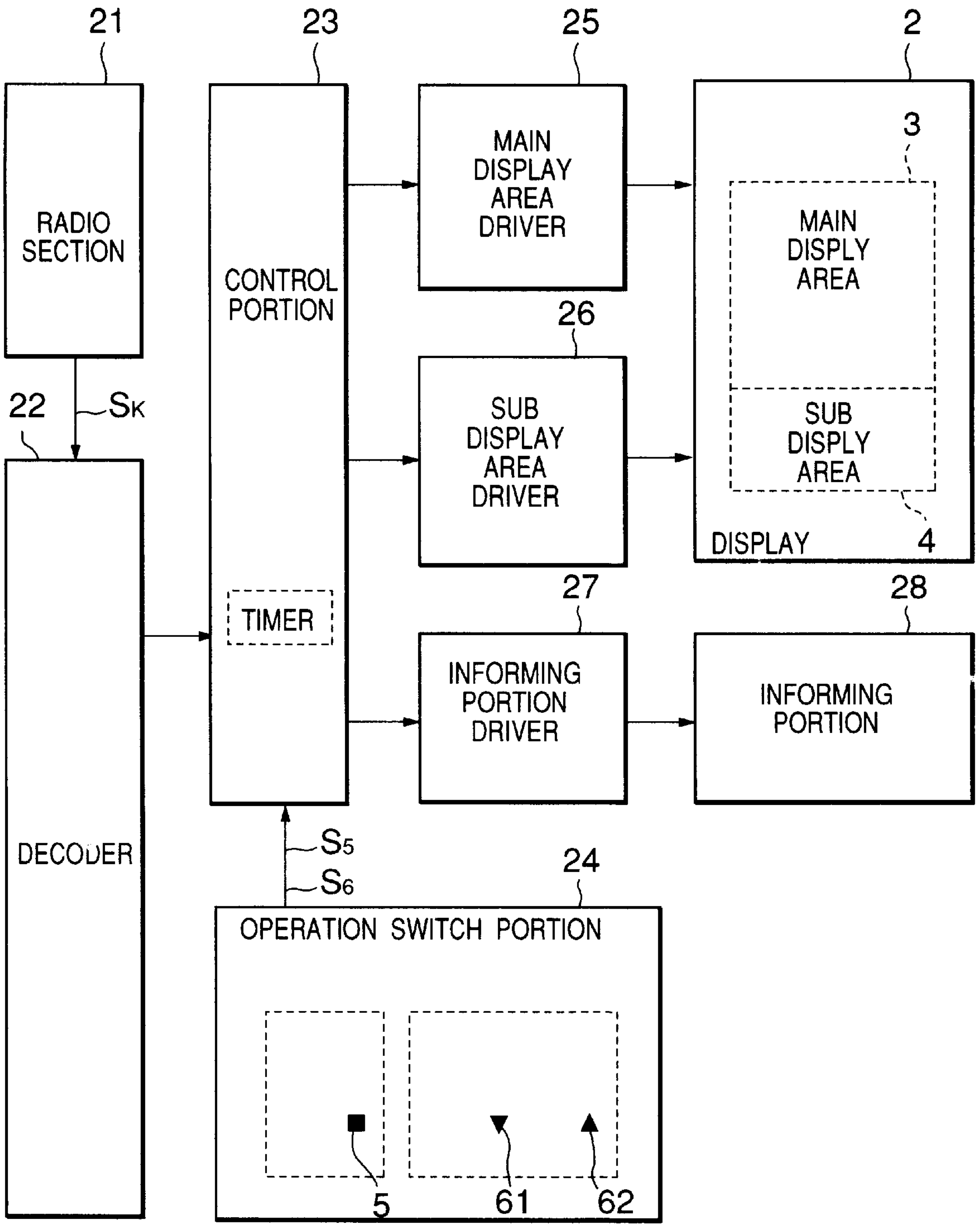
FIG. 2 is a block diagram showing an electrical structure of the portable radio apparatus illustrated in FIG. 1.

FIG. 2 is a block diagram showing an electrical configuration of the portable radio apparatus according the preferred embodiment of the present invention. In this drawing, like reference numerals denote like or corresponding parts in FIG. 1, thereby omitting the explanation thereof.

Referring to FIG. 2, a radio section 21 receives from a non-illustrated antenna an electric wave transmitted from a non-illustrated radio base station. The radio section 21 detects a receive signal and outputs a detected signal SK to a decoder 22. The decoder 22 decodes information contained in the received electric wave from the detected signal SK. Included in such information, is a call number or a message, for example. The decoder 22 has a call number which is inherent to and assigned to each portable radio apparatus.

A controller 23 controls respective parts in the apparatus. The detailed operation of the controller 23 will be described later. An operation switch portion 24 is constituted by the operation switch 5 and the operation switches 61 and 62 illustrated in FIG. 1(*a*). The operation switch portion 24 outputs a push signal S5 when the operation switch 5 is pushed and a push signal S6 when the operation switches 61 and 62 are both pushed.

A display drive means is composed of a main display area drive portion 25 and a sub display area drive portion 26. The main display area drive portion 25 drives the main display area 3 of the display portion 2, while the sub display area drive portion 26 drives the sub display area 4 of the display portion 2. An information drive portion 27 drives an informing portion 28. The informing portion 28 includes a speaker, a vibrator, an LED (light-emitting diode) and others and informs the carrier of an incoming call.

The display control operation of the portable radio apparatus according to the above embodiment will now be described with reference to the operation flowchart of FIGS. 3 and 4.

With messages being displayed in the main display area 3 and the sub display area 4 of the display portion 2 shown in FIG. 1(*a*), the carrier moves the radio apparatus main body 1 in a direction indicated by an arrow A in the drawing to put the radio apparatus main body 1 in the holster 7 as shown in FIG. 1(*c*). The operation switches 61 and 62 are consequently pushed by the projections 81*a* and 82*a* of the engagement pieces 81 and 82 for pushing the switches, and the push signal S6 is output from the operation switch portion 24 to the controller 23 (steps S101 and S102 in FIG. 3). In response to this, the controller 23 issues a command to the main display area drive portion 25 in order to erase the displayed message in the main display area 3 (step S103). By doing so, the displayed message in the main display area 3 is eliminated as shown in FIG. 1(*c*), and the message is displayed only in the sub display area 4 (step S104). In this state, or more preferably, with the belt attachment clip 9 shown in FIG. 9 being put on the carrier's belt, the carrier carries the radio apparatus main body 1.

Assuming that a caller inputs a call number of the above-described portable radio apparatus and a message by using a telephone terminal (not shown), the radio base station transmits the electric wave including information of the call number and the message. This electric wave is received by the radio section 21 shown in FIG. 2. The radio section 21 outputs the detected signal SK to the decoder 22. In response to this output, the decoder 22 collates the call number obtained by decoding the detected signal with a call number held therein, and outputs to the controller 23 a signal indicating that there is an incoming call if the both numbers coincide with each other. The decoder 22 then outputs to the controller a message obtained by decoding the detected signal SK as message data (step S106). If the both numbers do not coincide with each other, the control returns to the process of the step S101.

Since the push signal S6 is input, the controller 23 outputs a drive command only to the sub display area drive portion 26 and also outputs a drive command to the information drive portion 27 (steps S107 and S108). In response to this output, the "speaker" symbol in the sub display area 4 shown in FIG. 1(*c*) is turned on and the informing portion 28 shown in FIG. 2 generates the speaker sound, vibration or the like so that the carrier is informed of an incoming call (steps S109 and S110).

Figure 4:
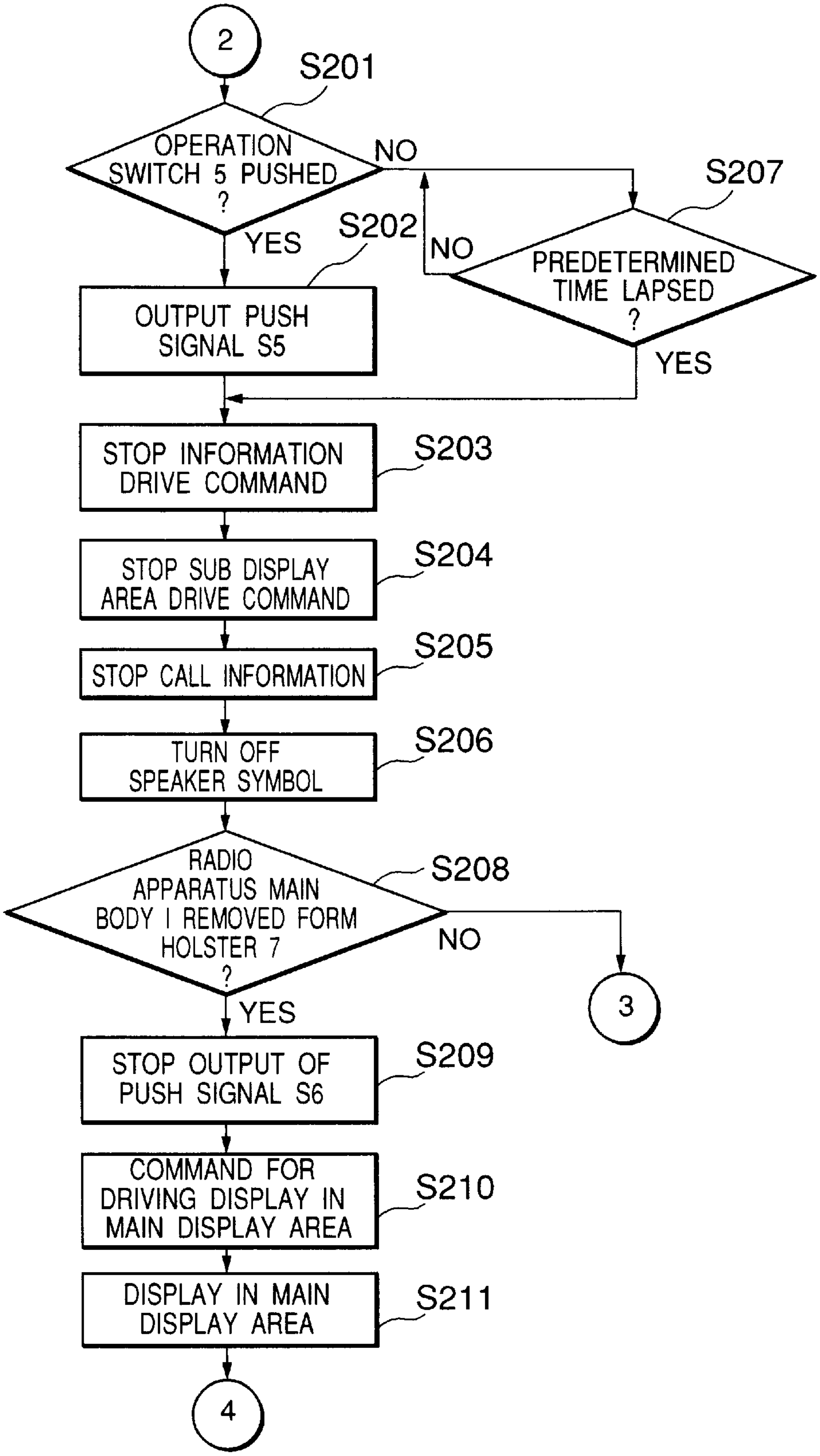
FIG. 4 is an operation flowchart showing the operation following that illustrated in FIG. 3.
Figure 5:
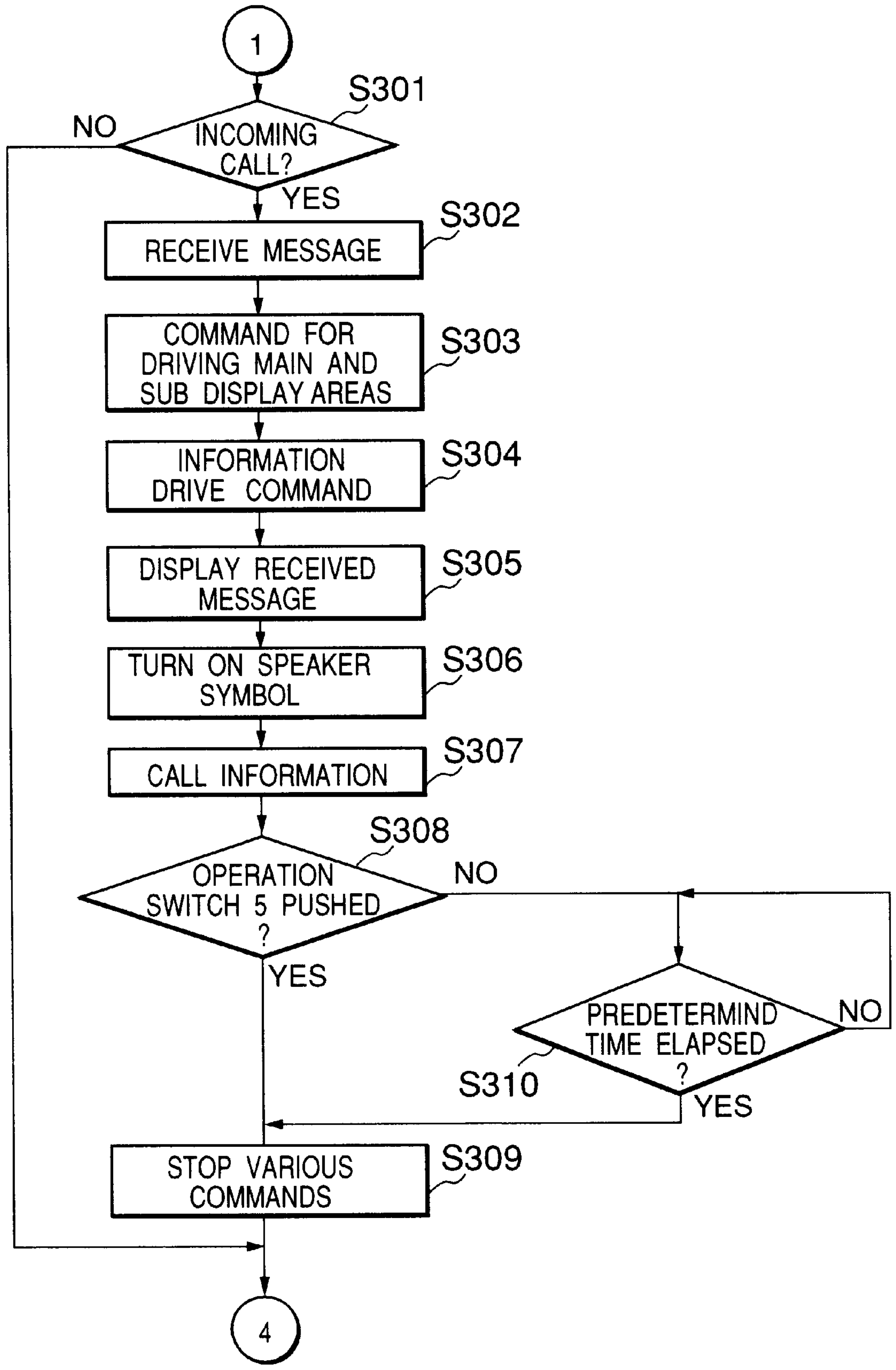
FIG. 5 is an operation flowchart showing the calling operation with the portable radio apparatus not being housed in the holster.

When the carrier becomes aware of the call information, he or she pushes the operation switch 5 shown in FIG. 1(*c*) (step S201 in FIG. 4). In response to this operation, the operation switch portion 24 shown in FIG. 2 outputs the push signal S5 (step S202), and the controller 23 recognizes this signal to stop the drive command to the information drive portion 27 (step S203). The controller 23 also stops the drive command to the sub display area (step S204). In accordance with these stop commands, drive by the informing section 28 stops in order to suspend generation of the speaker sound (step S205) and turn off the speaker symbol (step S206).

On the other hand, the controller 23 measures the lapsed time after the drive command is issued to the information drive portion 27, and automatically stops the drive command issued to the information drive portion 27 when the measured time becomes equal to or above a predetermined time (step S207) even though the carrier does not push the operation switch 5 (NO in step S201).

After stopping the call information, when the carrier pulls the radio apparatus main body 1 shown in FIG. 1(*c*) from the holster 7 in order to use the radio apparatus main body 1 (step S208), the pushed engagement pieces 81 and 82 for pushing the operation switches 61 and 62 of the radio apparatus main body 1 are forced back. Output of the push signal S6 from the operation switch portion 24 shown in FIG. 2 therefore stops (step S209). In response to this stop, the controller 23 recognizes that the radio apparatus main body 1 is used and outputs the drive command to the main display area drive portion 25 (step S210). The main display area 3 therefore displays the above-mentioned message, e.g., a current time (step S211). In other words, both the main display area 3 and the sub display area 4 in the display portion 2 display information. Here, the received message may be displayed in the main display area 3.

Figure 3:
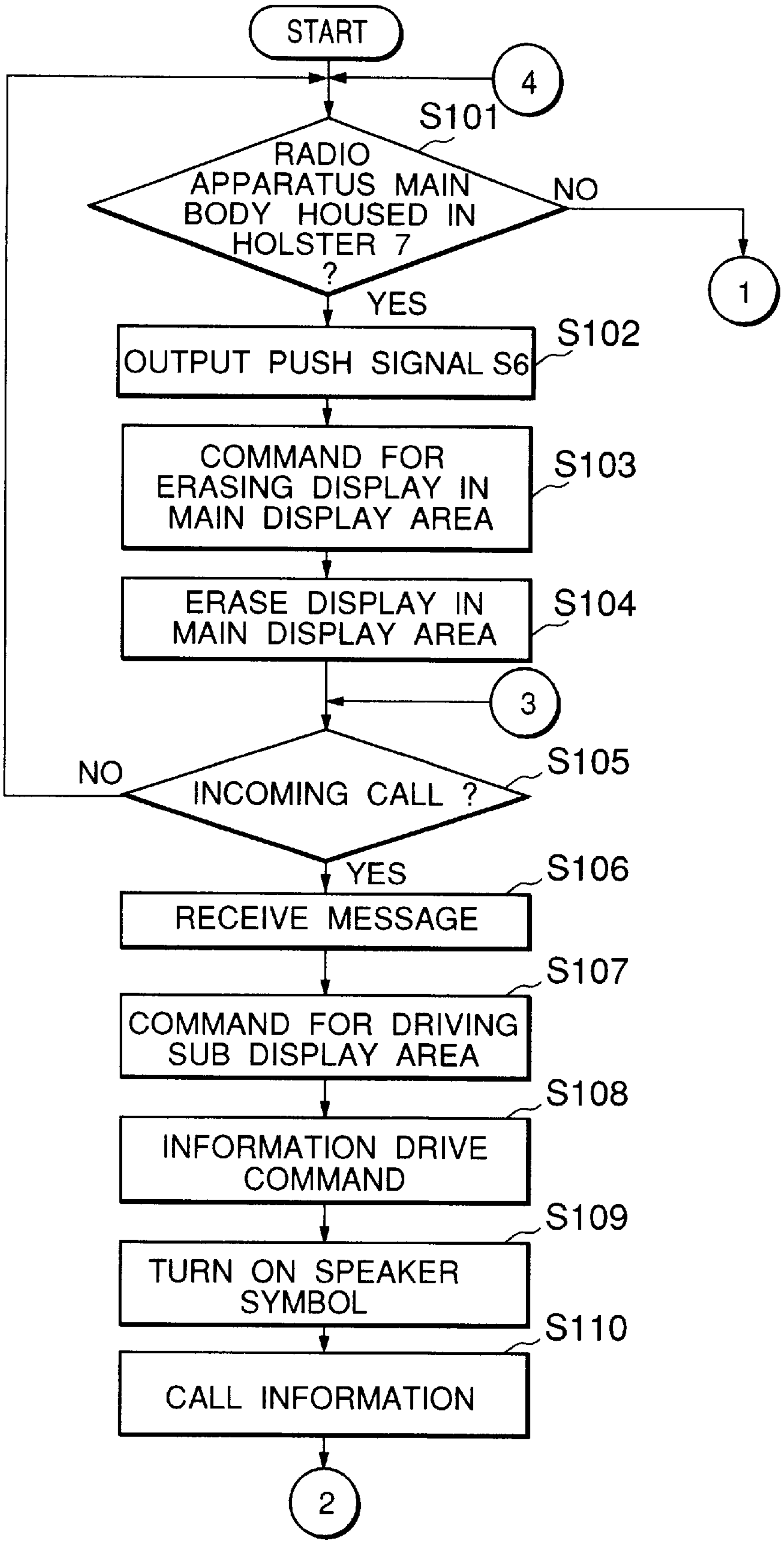
FIG. 3 is an operation flowchart showing the calling operation with the portable radio apparatus illustrated in FIG. 1 being housed in a holster.

When use of the radio apparatus main body 1 is finished, the carrier again puts the radio apparatus main body 1 in the holster 7 as shown in FIG. 1(*c*) (step S101 in FIG. 3). By doing so, the engagement pieces 81 and 82 for pushing the switches again push the operation switches 61 and 62, and the operation switch portion 24 illustrated in FIG. 2 again outputs the push signal S6 to the controller 23 (step S102). In response to this output, the controller 23 stops the drive command with respect to the main display area drive portion 25 (step S103). The display portion 2 switches the full display in both the main display area 3 and the sub display area 4 to the partial display only in the sub display area 4 (step S104).

Meanwhile, if the carrier does not put the radio apparatus main body 1 into the holster 7 in the process of the step S101 in FIG. 3, judgment is made upon whether there is an incoming call to its own apparatus (step S301). The control returns to the step S101 if there is no incoming call, and a message signal following the call number is received if there is an incoming call (step S302). The controller subsequently outputs the drive command to the main display area drive portion 25 and the sub display area drive portion 26 (step S303) and further outputs the drive command to the information drive portion 27 (step S304). In response to this output, the received message is displayed in the main display area 3 (step S305) and the speaker symbol is turned on in the sub display area 4 (step S307). Further, the informing portion 28 informs of the incoming call (step S307).

When the carrier operates the operation switch 5 (step S308), the various commands are suspended (step S309). That is, the received message is eliminated in the main display area 3, and the speaker symbol is turned off in the sub display area 4. Also, the call information is stopped. However, the received message may not be unnecessarily erased. Namely, only the operation indicating the call information is stopped by one operation of the operation switch 5, and the received message may be erased after confirmation is made by the carrier.

As described above, according to the portable radio apparatus of the foregoing preferred embodiment, since the message is necessarily displayed in the display portion 2 when the carrier uses his/her own apparatus, operability felt by the carrier is further improved as compared to the prior art portable radio apparatus.

Further, according to the portable radio apparatus of the above preferred embodiment, the message is displayed in all the areas in the display portion 2 only when used, which further reduces the consumption current involved by the display operation as compared with the prior art, thus leading to the long duration of life of the battery.

Although the above has described the portable radio apparatus according to the preferred embodiment of the present invention with reference to the drawings, the specific configuration is not restricted to this embodiment, and any modification and change in design is included in the present invention within the true scope thereof.

For example, there has been explained an example such that the display portion 2 is switched from the full display to the partial display depending on the fact that the radio apparatus main body 1 is housed/removed into/from the holster 7 in the above-described portable radio apparatus, but the present invention is not restricted to this configuration, and the full display of the display portion 2 may be eliminated when the radio apparatus main body 1 is housed in the holster 7. Accordingly, the electric current consumed at the time of display operation can be further reduced. The duration of life of the battery can therefore becomes longer. In this case, it is unnecessary to provide the two types of drive portion, i.e., the main display area drive portion 25 and the sub display area drive portion 26, and the configuration of the apparatus can be therefore simplified.

In addition, although the above has described such an example as that the message is displayed in both the main display area 3 and the sub display area 4 of the display portion 2 when the radio apparatus main body 1 is used, namely, when the radio apparatus main body 1 is not housed in the holster 7 in the portable radio apparatus, the present invention is not restricted to this structure, and the message may be displayed only in the main display area 3.

In the above example, the current time is displayed in the main display area 3 of the display portion 2 in the portable radio apparatus, but the present invention is not limited such a configuration so as to display any information, and any other content or a name of an operator company may be displayed, for example.

Further, although the operation switches 61 and 62 can be operated by the carrier and they can also serve to detect whether the radio apparatus main body 1 is housed in the holster 7 in the portable radio apparatus according to the embodiment, the present invention is not restricted to this structure, and a switch for carrying out such detection may be separately provided.

Furthermore, it is detected that the radio apparatus main body 1 is housed in the holster 7 when the operation switches 61 and 62 are both pushed in the portable radio apparatus according to this embodiment, but the present invention is not limited to this configuration, and such detection may be effected by using one, three or more operation switches. In other words, an operation switch which is not operated or does not have to be operated by the carrier when the radio apparatus main body 1 is housed in the holster 7 may be used as the operation switch for detection.

Moreover, in the portable radio apparatus according to the embodiment, a timer for measuring a lapsed time after one operation switch 6 is pushed by the engagement piece 8 for pushing the switch may be provided in order that the controller 23 can recognize that the radio apparatus main body 1 is housed in the holster 7 when the time measured by the timer becomes equal to or above a predetermined time.

In addition, although a pager has been described as the radio apparatus main body 1 in the portable radio apparatus according to the embodiment, the present invention is not limited to this configuration, and a portable telephone or a PHS may be used as the radio apparatus main body 1.

As mentioned above, in the present invention, since the displayed message is partially erased by the control means when the radio apparatus main body is housed in the housing means, i.e., when the radio apparatus main body is not used, the electric current consumed during the display operation is smaller than that of the prior art, which realizes the long duration of life of the battery.

In the present invention, the message or the current information can be assuredly displayed in the display portion when the radio apparatus main body is removed from the housing means, namely, when the radio apparatus main body is used, and hence operability felt by the carrier can be improved.

In this invention, the full display effected by the display means can be eliminated when the radio apparatus main body is not used, and hence the long duration of life of the battery can be realized.

Additionally, it is possible to detect that the radio apparatus main body is housed in the housing means by comparing a result of measurement obtained by the timer means with a predetermined time, which leads to the assured detection.

While the invention has been described with reference to specific embodiments thereof, it will be appreciated by those skilled in the art that numerous variations, modifications, and embodiments are possible, and accordingly, all such variations, modifications, and embodiments are to be regarded as being with in the spirit and scope of the invention.

What is claimed is:

1. A portable radio apparatus having a radio apparatus main body and display means which is provided to the radio apparatus main body and displays at least a communication message and time information, the portable radio apparatus comprising:

housing means for housing the radio apparatus main body;

detecting means for detecting whether the radio apparatus main body is housed in the housing means; and control means for erasing at least a part of the displayed message or information in the display means based on a result of detection performed by the detecting means when the radio apparatus main body is housed in the housing means.

2. A portable radio apparatus according to claim 1, wherein the control means erases all of the displayed message or information in the display means.

3. A portable radio apparatus according to claim 1, wherein switch means is provided to the radio apparatus main body; engagement means for pushing the switch means is formed to the housing means at a part overlapping on the switch means when the radio apparatus main body is housed; and the detecting means detects that the radio apparatus main body is housed in the housing means when the switch means is pushed by the engagement means.

4. A portable radio apparatus according to claim 3, wherein at least two switch means are provided and at least two engagement means are formed.

5. A portable radio apparatus according to claim 1, wherein switch means is provided to the radio apparatus main body; engagement means for pushing the switch means is formed to the housing means at a part overlapping on the switch means when the radio apparatus main body is housed; timer means for measuring a time lapsed after the switch means is pushed by the engagement means is provided; and the detecting means detects that the radio apparatus main body is housed in the housing means when a result of measurement effected by the timer means reaches or exceeds a predetermined time.

6. A portable radio apparatus according to claim 2, further comprising:

switching means provided to the radio apparatus main body;

engagement means for pushing the switching means, formed in the housing means at a part overlapping on the switching means when the radio apparatus main body is housed; and wherein the detecting means detects that the radio apparatus main body is housed in the housing means when the switching means is pushed by the engagement means.

7. A portable radio apparatus according to claim 6, wherein at least two switching means are provided and at least two engagement means are formed.

8. A portable radio apparatus according to claim 2, further comprising:

switching means provided to the radio apparatus main body;

engagement means for pushing the switching means, formed to the housing means at a part overlapping on the switching means when the radio apparatus main body is housed;

timer means for measuring a time elapsed after the switching means is pushed by the engagement means; and wherein the detecting means detects that the radio apparatus main body is housed in the housing means when a result of measurement effected by the timer means is no less than a predetermined time.

9. A portable radio apparatus comprising:

display means for displaying at least a message;

judging means for judging whether the portable radio apparatus is housed in housing means of the portable radio apparatus; and control means for controlling display by the display means in response to a result of judgment performed by the judging means, wherein the control means erases a part of the displayed message or information in the display means when the portable radio apparatus is housed in the housing means.

10. A portable radio apparatus according to claim 9, further comprising switches operated by a carrier.

11. A portable radio apparatus according to claim 10, wherein the judging means detects that the switches are operated in order to further detect the portable radio apparatus is housed in the housing means.

12. A portable radio apparatus according to claim 11, wherein the switches are pushed by means formed to the housing means for pushing the switch.

13. A display control method for a portable radio apparatus comprising the steps of:

displaying at least a message;

judging whether the portable radio apparatus is housed in a housing means of the portable radio apparatus; and controlling display by a display means in response to a result of judgment performed by the judging means, wherein display by the display means is partially erased with the portable radio apparatus is housed in the housing means.

14. A display control means for a portable radio apparatus comprising the steps of displaying at least a message;

judging whether the portable radio apparatus is housed in the housing means of the portable radio apparatus based on activation of at least two switches; and controlling display by a display means in response to a result of judgment performed by the judging means, wherein display by the display means is partially erased when the portable radio apparatus is housed in the hosing means.

* * * * *